(12) United States Patent
Narayanaswamy et al.

(10) Patent No.: US 10,176,144 B2
(45) Date of Patent: Jan. 8, 2019

(54) PIGGYBACKING TARGET BUFFER ADDRESS FOR NEXT RDMA OPERATION IN CURRENT ACKNOWLEDGEMENT MESSAGE

(71) Applicant: Samsung Electronics Co., Ltd., Suwon-si, Gyeonggi-do (KR)

(72) Inventors: Purvaja Narayanaswamy, Santa Clara, CA (US); Manoj Guthala, Los Altos, CA (US); Hiren Desai, San Jose, CA (US); Andrew Tomlin, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 208 days.

(21) Appl. No.: 15/184,913

(22) Filed: Jun. 16, 2016

(65) Prior Publication Data

US 2017/0293588 A1    Oct. 12, 2017

Related U.S. Application Data

(60) Provisional application No. 62/321,653, filed on Apr. 12, 2016.

(51) Int. Cl.
*G06F 15/173* (2006.01)
*H04L 29/12* (2006.01)

(52) U.S. Cl.
CPC .... *G06F 15/17331* (2013.01); *H04L 61/2061* (2013.01)

(58) Field of Classification Search
CPC . H04L 61/2061; H04L 67/1097; H04L 69/32; G06F 15/17331; G06F 9/546; G06F 9/545; G06F 9/5077
USPC ........................................................ 709/212
See application file for complete search history.

(56) References Cited

U.S. PATENT DOCUMENTS

| 5,278,829 | A | * | 1/1994 | Dunlap | ................ | H04L 29/06 |
|---|---|---|---|---|---|---|
| | | | | | | 340/9.14 |
| 8,078,743 | B2 | | 12/2011 | Sharp et al. | | |
| 8,473,966 | B2 | | 6/2013 | Chow | | |
| 8,909,727 | B2 | | 12/2014 | Frey et al. | | |
| 9,146,785 | B2 | | 9/2015 | Tillier et al. | | |
| 2004/0252709 | A1 | | 12/2004 | Fineberg | | |
| 2008/0235409 | A1 | | 9/2008 | Ryzhykh | | |

(Continued)

*Primary Examiner* — Tu T Nguyen
(74) *Attorney, Agent, or Firm* — Innovation Counsel LLP

(57) ABSTRACT

A data storage system configured as node in a distributed data store is presented. The system comprises an RDMA-enabled network adapter, a buffer management unit, and an RDMA application interface. The network adapter is configured to establish communication with one or more other nodes in the distributed data store. The buffer management unit is configured to pre-register a plurality of memory blocks as RDMA buffers with one or more other nodes. The RDMA application interface is configured to: process RDMA operations initiated by one of the other nodes, and send an acknowledgement message to the one of the other nodes via the RDMA-enabled network adapter in response to completion of an RDMA operation initiated by the one of the other nodes, wherein the acknowledgement message includes a target address corresponding to a start address of an RDMA buffer available for use in a subsequent RDMA operation.

21 Claims, 3 Drawing Sheets

(56) References Cited

U.S. PATENT DOCUMENTS

2013/0246554 A1* 9/2013 Lv .................. G06F 9/466
                                                    709/213
2014/0207896 A1   7/2014 Hefty
2015/0347243 A1  12/2015 Guerin et al.

* cited by examiner

PIGGYBACKING TARGET BUFFER ADDRESS FOR NEXT RDMA OPERATION IN CURRENT ACKNOWLEDGEMENT MESSAGE

CROSS-REFERENCE TO RELATED APPLICATIONS

This application claims priority to and the benefit of U.S. Provisional Patent Application No. 62/321,653, titled "SYSTEM AND METHOD FOR REMOTE DIRECT MEMORY ACCESS (RDMA) TARGET DESTINATION ADDRESS PRE-REGISTRATION AND PIGGY BACKING DESTINATION ADDRESS FOR SUBSEQUENT MESSAGE IN ACKNOWLEDGEMENT" and filed on Apr. 12, 2016, the entire content which is incorporated herein by reference.

RELATED FIELD

The present disclosure relates in general to data storage systems. In particular, the present disclosure relates to a system and method of piggybacking target buffer address for next remote direct memory access (RDMA) operation in a current acknowledgement message.

BACKGROUND

A distributed data store is generally a computer network in which data is stored on a plurality of data storage systems. Each data storage system may be referred to as a node. For example, a data volume may be striped across multiple solid state drives (SSDs) in each node and across multiple nodes, and read and write operations from one node may be redirected to another node. Distributed data stores are highly scalable and less costly to maintain because the nodes can be easily added, removed, or replaced. As a result, distributed data stores are often used in data centers.

Although distributed data stores have been implemented using traditional Ethernet networks and traditional client-server architectures, such distributed data stores often suffered from high latency unless sufficient server CPU cores were provisioned to satisfy peak loads. This meant that server CPUs needed to be upgraded continually over time to satisfy increasing load demands, or the server clients needed to wait for additional server CPU resources to be spun up during load spikes.

Remote direct memory access (RDMA) offers a solution to the high latency problem of traditional Ethernet networks and traditional client-server architectures. RDMA allows direct memory access from the memory of one computer into that of another without involving either one's operating system. This permits high-throughput, low-latency networking, which is especially useful in large, parallel computer clusters. In view of these benefits, RDMA-enabled distributed data stores are increasingly being adopted.

Typically, when an application running on a local node performs a RDMA read or write operation on a remote node, the application would have to specify a target address of an RDMA buffer at the remote node. The RDMA buffer is where the local node would read from or write to in a remote RDMA operation. However, because each application running on each node manages its own buffer memory space and decides which portion thereof is available for use as an RMDA buffer, an RDMA buffer registration process is performed between the local node and the remote node before every remote RDMA operation. During the buffer registration process, an application running on the remote node allocates memory space for an RDMA buffer, and a target address of the RDMA buffer is shared with the local node. The remote node may share the target address with the local node via internode communication, for example, by exchanging small messages via RDMA.

This means that traditional applications using RDMA for remote node communication may encounter latency issues as a result of the RDMA buffer registration process. As a result, these latency issues may adversely affect the I/O performance of the distributed data store.

SUMMARY

The present disclosure provides a data storage system configured as node in a distributed data store. According to an example embodiment, the system comprises an RDMA-enabled network adapter, a buffer management unit, and an RDMA application interface. The RDMA-enabled network adapter configured to establish communication with one or more other nodes in the distributed data store. The buffer management unit is configured to pre-register a plurality of memory blocks as RDMA buffers with one or more other nodes. The RDMA application interface configured to: process RDMA operations initiated by one of the other nodes, and send an acknowledgement message to the one of the other nodes via the RDMA-enabled network adapter in response to completion of an RDMA operation initiated by the one of the other nodes, wherein the acknowledgement message includes a target address corresponding to a start address of an RDMA buffer available for use in a subsequent RDMA operation.

The present disclosure also provides a method of operating a data storage system configured as node in a distributed data store. According to an example embodiment, the method comprises: operating an RDMA-enabled network adapter of the data storage system to establish communication with one or more other nodes in the distributed data store, pre-registering a plurality of memory blocks as RDMA buffers with one or more other nodes, processing an RDMA operation initiated by one of the other nodes, and sending an acknowledgement message to the one of the other nodes via the RDMA-enabled network adapter in response to completion of the RDMA operation initiated by the one of the other nodes, wherein the acknowledgement message includes a target address corresponding to a start address of an RDMA buffer available for use in a subsequent RDMA operation.

The present disclosure also provides a non-transitory, computer-readable medium having stored thereon computer executable instructions. According to an example embodiment, when the instructions are executed by a computer processor of a data storage system configured as node in a distributed data store, the instructions cause the data storage system to: operate an RDMA-enabled network adapter of the data storage system to establish communication with one or more other nodes in the distributed data store, pre-register a plurality of memory blocks as RDMA buffers with one or more other nodes, process an RDMA operation initiated by one of the other nodes, and send an acknowledgement message to the one of the other nodes via the RDMA-enabled network adapter in response to completion of the RDMA operation initiated by the one of the other nodes, wherein the acknowledgement message includes a target address corresponding to a start address of an RDMA buffer available for use in a subsequent RDMA operation.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

Figure 1:
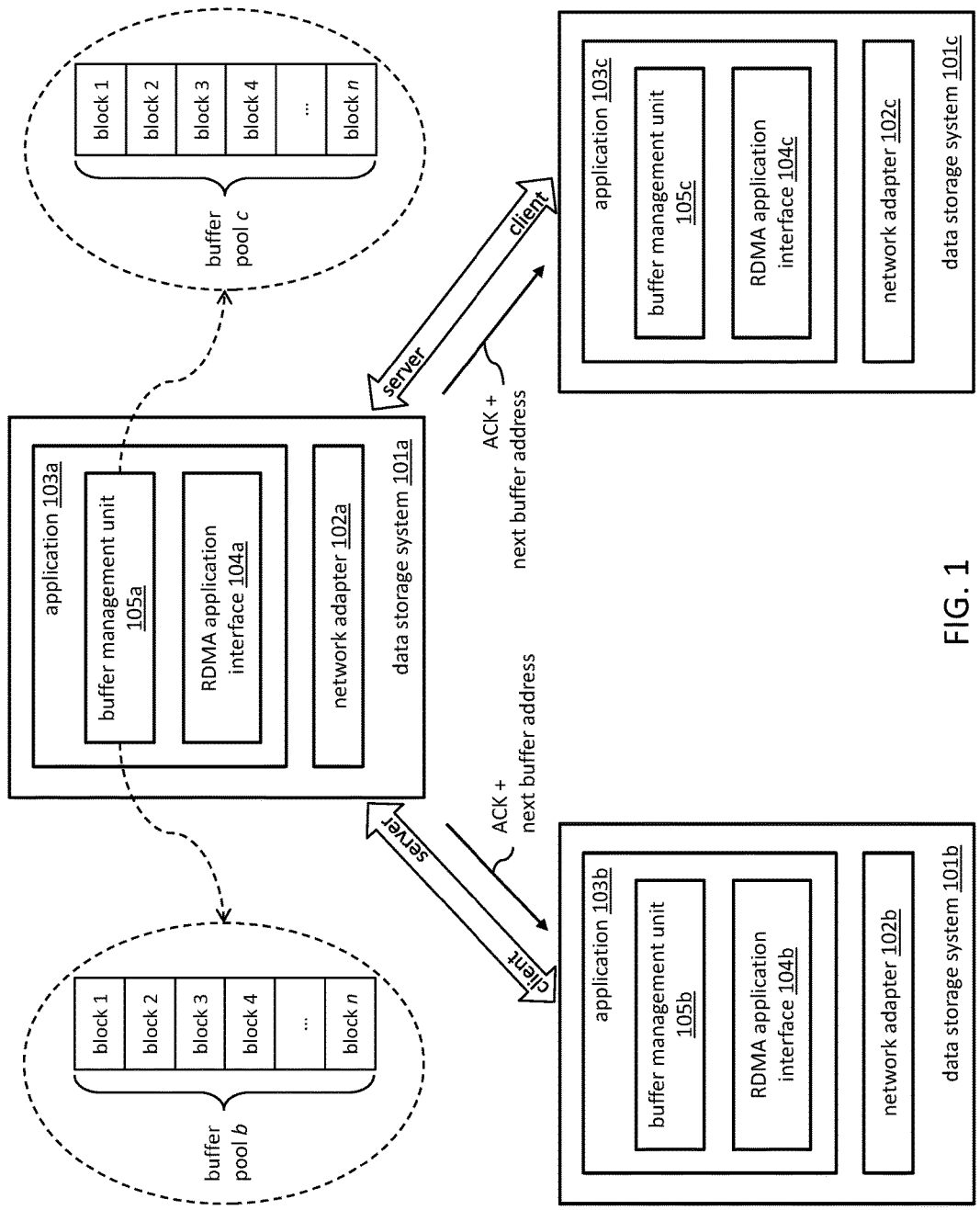
FIG. 1 is a block diagram illustrating internode communication among nodes of a distributed data store, according to an example embodiment of the present system and method.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide the present system and method. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

The terms "data storage system" and "node" are used interchangeably herein. Unless the context of their use clearly indicates to the contrary, these terms have the same meaning as understood by those of ordinary skill in the art.

As discussed earlier, traditional applications using RDMA for remote node communication may encounter latency issues because the RDMA buffer registration process is performed for every remote RDMA operation. As a result, these latency issues may adversely affect the I/O performance of the distributed data store.

Embodiments of the present system and method overcome these latency issues by having each node pre-register RDMA buffers that are intended for use in subsequent remote RDMA operations. Furthermore, after completion of a remote RDMA operation performed by a first node on a second node, the second node piggybacks or includes the target address of a next available RDMA buffer in the acknowledgement message (ACK) that the second node sends to the first node to indicate completion of the remote RDMA operation. By piggybacking the target address of the next available RDMA buffer in the acknowledgement message, it eliminates at least the need for the second node to send an extra RDMA small message including the target buffer address to the first node. Thus, unlike the approach of traditional applications, embodiments of the present system and method do not require performing an RDMA buffer registration process for every RDMA operation, thereby reducing latency of internode communication.

FIG. 1 is a block diagram illustrating internode communication among nodes of a distributed data store, according to an example embodiment of the present system and method. FIG. 1 shows three data storage systems 101 (respectively labeled 101a, 101b, and 101c) configured as nodes of a distributed data store, but the present system and method are not limited thereto and may be applied to a distributed data store having any number of nodes. Each data storage system includes an RDMA-enabled network adapter 102 (respectively labeled 102a, 102b, and 102c) and an application 103 (respectively labeled 103a, 103b, and 103c).

The RDMA-enabled network adapter 102 of each data storage system is configured to communicate with the network adapters of other data storage systems in the distributed data store. Though the network adapters 102 are RDMA-enabled, the mode of communication between two data storage systems is not limited to just RDMA communication. For example, the data storage system 101a may also communicate with each of the other data storage systems 101b and 101c using Transmission Control Protocol (TCP)/Internet Protocol (IP).

The application 103 running on each data storage system includes an RDMA application interface 104 (respectively labeled 104a, 104b, and 104c) and a buffer management unit 105 (respectively labeled 105a, 105b, and 105c). The RDMA application interface 104 enables the application 103 to communicate with the network adapter 102 to utilize its RDMA functionalities and processes RDMA operations initiated by a remote node. The buffer management unit 105 manages the buffer memory space of the application 102 for use as RDMA buffers.

In the case shown in FIG. 1, the data storage system 101a operates as a server node to both the data storage systems 101b and 101c, which are operating as client nodes. Thus, the data storage system 101a listens for RDMA traffic from the data storage systems 101b and 101c.

At cluster initialization of the nodes when the client-server roles of the data storage systems 101 are determined, the application 103a detects that the data storage system 101a has two possible clients, the data storage systems 101b and 101c, that have RDMA access to the data storage system 101a and can initiate and perform RDMA operations, such as a read operation or a write operation, on the data storage system 101a. In response to the detection, the buffer management unit 105a pre-registers a plurality of memory blocks as RDMA buffers for each of its possible clients, the data storage systems 101b and 101c.

The application 103a pre-registers the RDMA buffers by allocating locally in its buffer memory space a pool of n number of memory blocks b (hereinafter, the "buffer pool b") for use by the data storage system 101b and a pool of n number of memory blocks c (hereinafter, the "buffer pool c") for use by the data storage system 101c as RDMA buffers in subsequent RDMA operations, where n is a natural number. The RDMA buffers may be read and/or write buffers. The application 103a then sends information including a start address of the respective buffer pools to each of its possible clients. That is, through the use of the RDMA application interface 104a and the network adapter 102a, the application 103a sends information about buffer pool b, including its start address (e.g., address of block 1 in buffer pool b), to the data storage system 101b and information about buffer pool c, including its start address (e.g., address of block 1 in buffer pool c), to the data storage system 101c. This way, when one or more of the data storage systems 101b and 101c initiate and perform a subsequent RDMA operation on the data storage system 101*a*, the corresponding one or more of the data storage systems 101*b* and 101*c* already know which RDMA buffers to use.

After the data storage system 101*b* performs an RDMA operation on the data storage system 101*a*, the data storage system 101*a* sends an acknowledgement message (ACK) to the data storage system 101*b* via its network adapter 102*a* in response to completion of the RDMA operation initiated by the data storage system 101*b*, and the acknowledgement message includes a target address corresponding to a start address of an RDMA buffer in the buffer pool b that is available for use in the next RDMA operation. Similarly, after the data storage system 101*c* performs an RDMA operation on the data storage system 101*a*, the data storage system 101*a* sends an acknowledgement message to the data storage system 101*c* via its network adapter 101*b* in response to completion of the RDMA operation initiated by the data storage system 101*c*, and the acknowledgement message includes a target address corresponding to a start address of an RDMA buffer in buffer pool c that is available for use in the next RDMA operation.

In other words, the target address of a next RDMA buffer available for use in a subsequent RDMA operation is piggybacked onto the acknowledgement message that is sent after completion of each RDMA operation. Piggybacking the target address in this manner eliminates at least the need for the data storage system 101*a* to send extra RDMA small messages that include the target buffer addresses to the data storage systems 101*b* and 101*c*. Thus, unlike the approach of traditional applications, embodiments of the present system and method do not require performing an RDMA buffer registration process for every RDMA operation, thereby reducing latency of internode communication.

Figure 2:
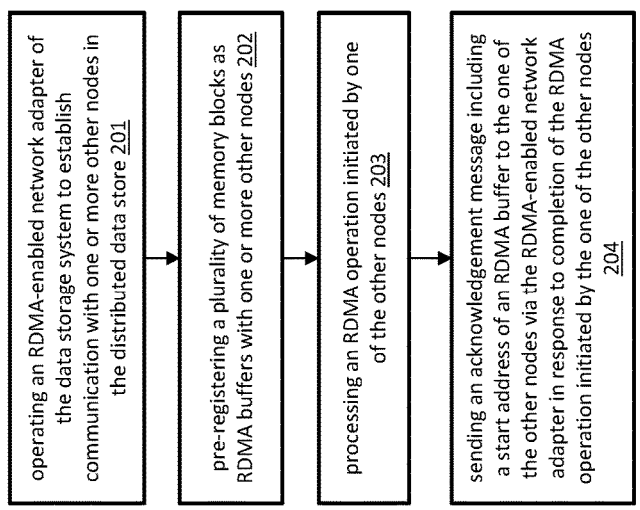
FIG. 2 shows a flowchart of high-level operations of a data storage system configured as a node in a distributed data store, according to an example embodiment of the present system and method.

FIG. 2 shows a flowchart of high-level operations of a data storage system configured as a node in a distributed data store, according to an example embodiment of the present system and method. The data storage system operates an RDMA-enabled network adapter of the data storage system to establish communication with one or more other nodes in the distributed data store (at 201). The data storage system pre-registers a plurality of memory blocks as RDMA buffers with one or more other nodes (at 202).

The data storage system pre-registers the plurality of memory blocks including allocating a pool of memory blocks for each one of the other nodes having remote RDMA access to the data storage system and sending information including a start address of the respective pool of memory blocks to each one of the other nodes having remote RDMA access to the data storage system. The data storage system further performs pre-registering of the plurality of memory blocks during cluster initialization of the distributed data store.

The data storage system processes an RDMA operation initiated by one of the other nodes (at 203). After the RDMA operation is completed, the data storage system sends an acknowledgement message to the one of the other nodes via the RDMA-enabled network adapter in response to completion of the RDMA operation initiated by the one of the other nodes, wherein the acknowledgement message includes a target address corresponding to a start address of an RDMA buffer available for use in a subsequent RDMA operation (at 204).

In more detail, the data storage system may assign a next memory block in the pool of memory blocks allocated for the one of the other nodes as a next RDMA buffer and return the start address of the next RDMA buffer to the one of the other nodes as the target address. If the data storage system determines that the first pool of memory blocks allocated for the one of the other nodes is filled with data, the data storage system may allocate a second pool of memory blocks for the one of the other nodes and return the start address of the second pool of memory blocks to the one of the other nodes as the target address.

To summarize, according to example embodiments of the present system and method, each node may pre-register and, thereby, locally reserve pools of memory blocks for use as RDMA buffers by other nodes during RDMA operations. At least one pool of memory blocks per other node may be reserved. The other nodes may be, for example, client nodes that have access RDMA to and can perform RDMA read or write operations on the instant node. The other nodes having RDMA access to the instant node are notified of their respective pool of pre-registered RDMA buffers. The data storage system further performs pre-registration of the RDMA buffers during cluster initialization when each of the nodes is initialized to function as part of the distributed data store.

Furthermore, according to embodiments of the present system and method, after the completion of an RDMA operation initiated by one of the other nodes on the instant node, the instant node sends an acknowledgement message to the initiating node that includes a target address of a next RDMA buffer for use in a subsequent RDMA operation. An advantage of embodiments of the present system and method is reduced latency that translates to improved I/O performance of the distributed data store.

Figure 3:
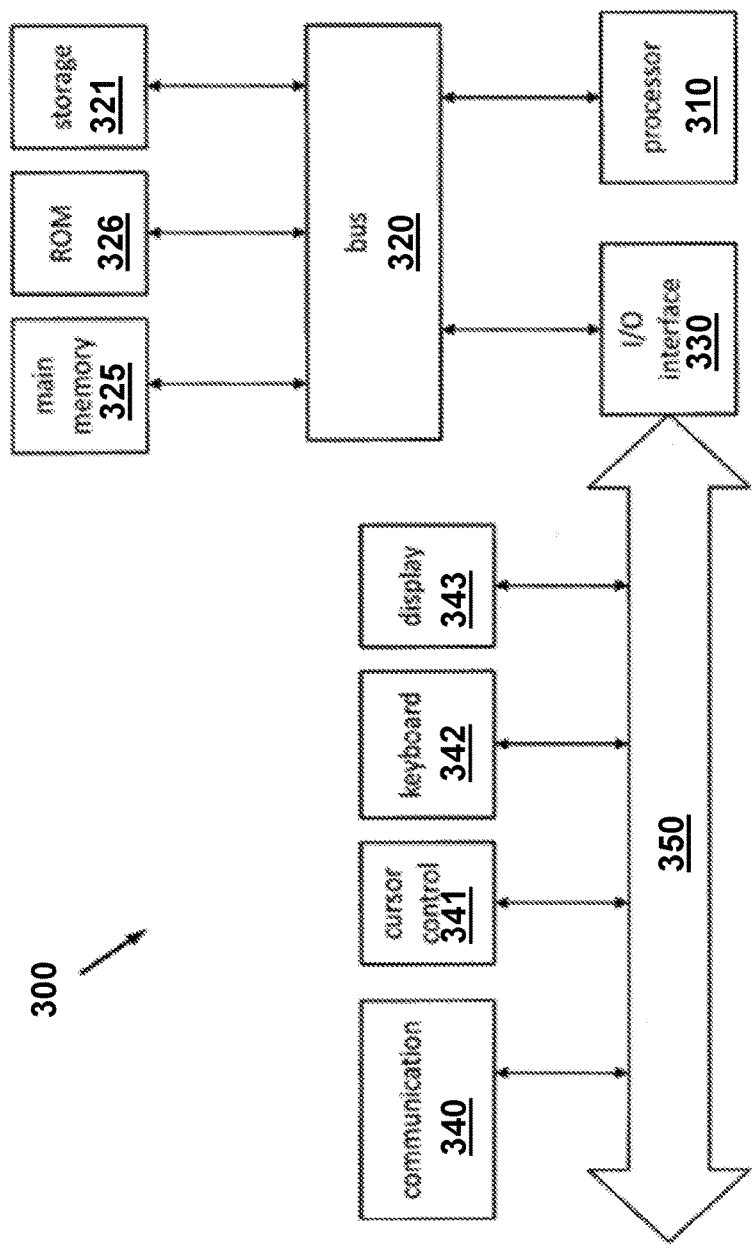
FIG. 3 illustrates an example computer architecture that may be used to implement embodiments of the present system and method, for example, the data storage system.

FIG. 3 illustrates an example computer architecture that may be used to implement embodiments of the present system and method, for example, the data storage system. The exemplary computer architecture may be used for implementing one or more components described in the present disclosure including, but not limited to, the user terminal and/or the proxy and data exchange platform servers. One embodiment of architecture 300 comprises a system bus 320 for communicating information, and a processor 310 coupled to bus 320 for processing information. Architecture 300 further comprises a random access memory (RAM) or other dynamic storage device 325 (referred to herein as main memory), coupled to bus 320 for storing information and instructions to be executed by processor 310. Main memory 325 also may be used for storing temporary variables or other intermediate information during execution of instructions by processor 310. Architecture 300 may also include a read only memory (ROM) and/or other static storage device 326 coupled to bus 320 for storing static information and instructions used by processor 310.

A data storage device 321 such as a magnetic disk or optical disc and its corresponding drive may also be coupled to architecture 300 for storing information and instructions. Architecture 300 can also be coupled to a second I/O bus 350 via an I/O interface 330. A plurality of I/O devices may be coupled to I/O bus 350, including a display device 343, an input device (e.g., an alphanumeric input device 342, a cursor control device 341, and/or a touchscreen device).

The communication device 340 allows for access to other computers (e.g., servers or clients) via a network. The communication device 340 may comprise one or more modems, network interface cards, wireless network interfaces or other interface devices, such as those used for coupling to Ethernet, token ring, or other types of networks.

Some portions of the detailed description herein are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, messaging servers, or personal computers may be used with programs in accordance with the teachings herein, or it may prove convenient to construct a more specialized apparatus to perform the required method steps. The required structure for a variety of these systems appears in the description above. A variety of programming languages may be used to implement the teachings of the disclosure as described herein.

Moreover, the various features of the representative examples and the dependent claims may be combined in ways that are not specifically and explicitly enumerated in order to provide additional embodiments of the present teachings. The dimensions and the shapes of the components shown in the figures are designed to help understand how the present teachings are practiced and do limit the dimensions and the shapes shown in the examples.

What is claimed is:

1. A data storage system configured as a node in a distributed data store, the data storage system comprising:
   an RDMA-enabled network adapter configured to establish communication with one or more other nodes in the distributed data store;
   a buffer management unit configured to pre-register a plurality of memory blocks as RDMA buffers with one or more other nodes; and
   an RDMA application interface configured to:
      process RDMA operations initiated by one of the other nodes, and
      send an acknowledgement message to the one of the other nodes via the RDMA-enabled network adapter in response to completion of an RDMA operation initiated by the one of the other nodes,
   wherein the acknowledgement message includes a target address corresponding to a start address of an RDMA buffer available for use in a subsequent RDMA operation.

2. The data storage system of claim 1, wherein pre-registering the plurality of memory blocks includes:
   allocating a pool of memory blocks for each one of the other nodes having remote RDMA access to the data storage system; and
   sending information including a start address of the respective pool of memory blocks to each one of the other nodes having remote RDMA access to the data storage system.

3. The data storage system of claim 2, wherein pre-registering the plurality of memory blocks is performed during cluster initialization of the distributed data store.

4. The data storage system of claim 2, wherein the buffer management unit is configured to:
   assign a next memory block in a pool of memory blocks as a next RDMA buffer, and
   return a start address of the next RDMA buffer.

5. The data storage system of claim 4, wherein the target address corresponds to the start address of the next RDMA buffer.

6. The data storage system of claim 2, wherein the buffer management unit is configured to:
   determine that a first pool of memory blocks allocated for the one of the other nodes is filled with data, and
   allocating a second pool of memory blocks for the one of the other nodes.

7. The data storage system of claim 6, wherein the target address corresponds to a start address of the second pool of memory blocks.

8. A method of operating a data storage system configured as a node in a distributed data store, the method comprising:
   operating an RDMA-enabled network adapter of the data storage system to establish communication with one or more other nodes in the distributed data store;
   pre-registering a plurality of memory blocks as RDMA buffers with one or more other nodes;
   processing an RDMA operation initiated by one of the other nodes; and
   sending an acknowledgement message to the one of the other nodes via the RDMA-enabled network adapter in response to completion of the RDMA operation initiated by the one of the other nodes,
   wherein the acknowledgement message includes a target address corresponding to a start address of an RDMA buffer available for use in a subsequent RDMA operation.

9. The method of claim 8, wherein pre-registering the plurality of memory blocks includes:
   allocating a pool of memory blocks for each one of the other nodes having remote RDMA access to the data storage system; and sending information including a start address of the respective pool of memory blocks to each one of the other nodes having remote RDMA access to the data storage system.

10. The method of claim 9, wherein pre-registering the plurality of memory blocks is performed during cluster initialization of the distributed data store.

11. The method of claim 9, further comprising:
assigning a next memory block in a pool of memory blocks as a next RDMA buffer, and
returning a start address of the next RDMA buffer.

12. The method of claim 11, wherein the target address corresponds to the start address of the next RDMA buffer.

13. The method of claim 9, further comprising:
determining that a first pool of memory blocks allocated for the one of the other nodes is filled with data, and
allocating a second pool of memory blocks for the one of the other nodes.

14. The method of claim 13, wherein the target address corresponds to a start address of the second pool of memory blocks.

15. A non-transitory, computer-readable medium having stored thereon computer executable instructions that, when executed by a computer processor of a data storage system configured as node in a distributed data store, cause the data storage system to:
operate an RDMA-enabled network adapter of the data storage system to establish communication with one or more other nodes in the distributed data store;
pre-register a plurality of memory blocks as RDMA buffers with one or more other nodes;
process an RDMA operation initiated by one of the other nodes; and
send an acknowledgement message to the one of the other nodes via the RDMA-enabled network adapter in response to completion of the RDMA operation initiated by the one of the other nodes,
wherein the acknowledgement message includes a target address corresponding to a start address of an RDMA buffer available for use in a subsequent RDMA operation.

16. The non-transitory, computer-readable medium of claim 15, wherein the computer executable instructions pre-register the plurality of memory blocks including:
allocate a pool of memory blocks for each one of the other nodes having remote RDMA access to the data storage system; and
send information including a start address of the respective pool of memory blocks to each one of the other nodes having remote RDMA access to the data storage system.

17. The non-transitory, computer-readable medium of claim 16, wherein the computer executable instructions pre-register the plurality of memory blocks during cluster initialization of the distributed data store.

18. The non-transitory, computer-readable medium of claim 16, wherein the computer executable instructions further:
assign a next memory block in a pool of memory blocks as a next RDMA buffer, and
return a start address of the next RDMA buffer.

19. The non-transitory, computer-readable medium of claim 18, wherein the target address corresponds to a start address of the second pool of memory blocks.

20. The non-transitory, computer-readable medium of claim 16, wherein the computer executable instructions further:
determine that a first pool of memory blocks allocated for the one of the other nodes is filled with data, and
allocate a second pool of memory blocks for the one of the other nodes.

21. The non-transitory, computer-readable medium of claim 20, wherein the target address corresponds to a start address of the second pool of memory blocks.

* * * * *